United States Patent [19]
Darland et al.

[11] Patent Number: 5,467,290
[45] Date of Patent: Nov. 14, 1995

[54] SURVEY SYSTEM AND METHOD

[75] Inventors: Fred S. Darland, Seal Beach, Calif.; Jerry A. Durgin, Wright, Wyo.

[73] Assignee: Atlantic Richfield Company, Los Angeles, Calif.

[21] Appl. No.: 108,364

[22] Filed: Aug. 18, 1993

[51] Int. Cl.$^6$ .............................. G01C 1/02; G06F 17/40
[52] U.S. Cl. .................. 364/561; 364/559; 364/449; 364/460; 342/386; 342/463; 324/323
[58] Field of Search ................. 364/559, 424.07, 364/443, 448, 449, 460, 561; 367/14; 342/357, 387, 352, 140, 367, 386, 463; 324/330, 331, 323; 455/15, 47; 375/5, 25; 340/989, 993; 33/290, 292, 294; 356/2, 3

[56] References Cited

U.S. PATENT DOCUMENTS

| | | | |
|---|---|---|---|
| 3,617,866 | 11/1971 | Dowsett et al. | 324/330 |
| 3,691,560 | 9/1972 | Hammack | 342/387 |
| 3,714,573 | 1/1973 | Grossman | 342/387 |
| 3,825,829 | 7/1974 | Braun | 325/6 |
| 3,828,867 | 8/1974 | Elwood | 367/14 |
| 4,134,069 | 1/1979 | Shiki | 325/11 |
| 4,198,600 | 4/1980 | Oguchi et al. | 455/15 |
| 4,686,474 | 8/1987 | Olsen et al. | 324/331 |
| 4,814,711 | 3/1989 | Olsen et al. | 324/331 |
| 4,820,041 | 4/1989 | Davidson et al. | 364/424.07 |
| 4,955,083 | 9/1990 | Phillips et al. | 455/47 |
| 4,965,586 | 10/1990 | O'Neill et al. | 342/357 |
| 5,014,066 | 5/1991 | Counselman, III | 342/352 |
| 5,212,714 | 5/1993 | Grindahl et al. | 375/5 |

Primary Examiner—Emanuel T. Voeltz
Assistant Examiner—Edward Pipala
Attorney, Agent, or Firm—Michael E. Martin

[57] ABSTRACT

A survey system including a survey instrument operable to receive signals indicating the Easting, Northing and elevation of a surveyed point. The survey instrument transmits data regarding the surveyed point coordinates to a radio terminal mounted on the survey instrument and having a command keyboard associated therewith. The radio terminal is operable to communicate with a base radio and controller connected to a digital computer which stores survey data for a predetermined number of survey points and is capable of performing calculations of at least elevations of points disposed intermediate a set of coordinates on a survey grid and calculating hole depth for blastholes based on the elevation of a surveyed point on the surface of material from which the hole is to be drilled. The base radio and controller are operable to communicate with plural survey instrument and radio terminal units. The system allows the use of field survey instruments without requiring the placement of the central processing unit and its databases in the field. Relay radio transceivers or modems may be interposed between the controller and the central processing unit. The system may utilize an asynchronous PC type central processing unit in conjunction with commercially available electronic survey instruments.

13 Claims, 2 Drawing Sheets

SURVEY SYSTEM AND METHOD

BACKGROUND OF THE INVENTION

1. Field of the Invention

The present invention pertains to a survey system and method utilizing one or more field survey instruments adapted to transmit readings and receive data and instructions via a field terminal and radio transmitter and multiplexer and a radio modem linked to a remote central processing unit for comparison of measured survey points with predetermined survey data in accordance with requirements for certain tasks such as in reclaiming surface mined lands and in preparing surface minable lands for removal of overburden.

2. Background

In certain survey operations a substantial number of survey points must be obtained and compared with a predetermined or prescribed topography or a set of predetermined survey points for carrying out certain excavating operations. For example, in surface mining operations, the requirement to restore or reclaim the earth's topography in a particular region which has been mined requires a relatively precise grid of survey points defining surface contours which must be adhered to by the miner after the ore has been removed from beneath an overburden layer. Still further, in surface mining operations it is often necessary to provide a large number of survey points for guiding excavating apparatus or for carrying out blasthole drilling operations with some precision. Movement of large amounts of earth material in surface mining and construction operations by a technique known as blast casting requires relatively precise survey operations for locating the position and direction of drilled blastholes.

Although automatic survey instruments are known in the art which accurately and quickly provide direction, distance and elevation readings of a point, heretofore in field operations it has been necessary to compare the values read by the instrument with tables carried into the field either in printed form or stored in a portable digital computer. The values read by the survey instrument are then compared with the prescribed values for the point being surveyed and corrections are relayed by the instrument operator via portable radio or other signalling means to the operator of the survey rod at the point in question.

For example, in adhering to predetermined survey grids for reclaimed lands which have been surface mined, data prescribing the locations of points on the grid may be stored on portable digital computers which can be taken into the field. To confirm the proper contouring of the land by earth moving equipment, it is necessary to verify the work in progress of a reclaimed surface.

Accordingly, a surveyor surveys predetermined points to obtain the so-called x, y and z values (Northing, Easting and elevation) of the points, record the survey instrument readings and hand enter those values into the computer. The computer is, in many instances, adapted to then compare the position of a particular point with the predetermined required position and provide a reading to advise the surveyor if the elevation of the actual point, for example, is "high" or "low". The surveyor then marks a stake with information to provide either cutting or filling of earth material and then moves to another point.

Since the readings of the survey instrument are required to be manually entered into a computer, each survey team is required to have its own computer and there are many chances for error in transferring the information. The rigorous requirements of field use in surveying is also not conducive to the relatively fragile structural features of many commercially available computers.

Accordingly, there has been a need to improve the accuracy and speed with which field surveys may be conducted of reclaimed lands, prescribed surface contours, and other survey operations, particularly those carried out in large surface mines. It is to this end that the present invention has been developed with a view to providing a system and method which includes a remote, permanent position for a central processing unit or computer for storing and providing data for predetermining the location of survey points and for improving the accuracy and speed with which surveys which require a large number of data entries are carried out.

SUMMARY OF THE INVENTION

The present invention provides a unique survey system whereby survey data may be retrieved and manipulated in the field more accurately and quickly.

In accordance with an important aspect of the invention, one or more survey instruments are adapted to transmit and receive information to locate survey points by way of a portable command terminal directly connected to each survey instrument and having a radio transceiver for communicating with a second radio transceiver, which second radio transceiver is adapted to be in communication with a digital computer or central processing unit for comparing measured field survey points and for transmitting data to the command terminal to advise the survey instrument operator of certain reference values with respect to the points being measured or located. In this way, survey operations may be carried out more efficiently utilizing a single, remotely positioned computer or data storage and processing unit which is adapted to store data relating to a large number of survey points and to perform calculations with respect to the parameters of a predetermined survey point.

In accordance with another important aspect of the present invention, a general purpose electronic survey instrument capable of determining Easting (x), Northing (y) and elevation (z) is adapted to transmit measured data and to receive predetermined data with respect to such parameters by way of a communications or command terminal connected directly to the survey instrument and having a radio transceiver associated therewith for communication with a remotely disposed central processing unit, which processing unit may store a large amount of survey point information and is capable of making certain survey calculations. The terminal is adapted to communicate with the central processing unit or CPU by way of a base radio transceiver and multiplexer wherein a plurality of survey instruments/command terminal units may be operated essentially simultaneously.

In accordance with still another important aspect of the present invention, an improved survey system and method is provided for surveying certain areas, such as so-called reclamation grids for reclaimed lands, which have been surface mined or otherwise require reclamation contouring. Yet another important aspect of the present invention pertains to an improved survey method for placing so-called shot holes or blastholes in blast casting of earth material.

The survey system and method of the present invention advantageously provides for storing survey data in a central or common database in a remotely located central processing unit or digital computer. The storing of the survey data in a common database also provides for multiple survey operators to have access to the same survey data and communication is established with the database through a unique combination of survey instruments and data transmission devices.

Those skilled in the art will recognize the above-mentioned features and advantages of the present invention, together with other superior aspects thereof, upon reading the description which follows in conjunction with the drawing.

DESCRIPTION OF PREFERRED EMBODIMENTS

Figure 1:
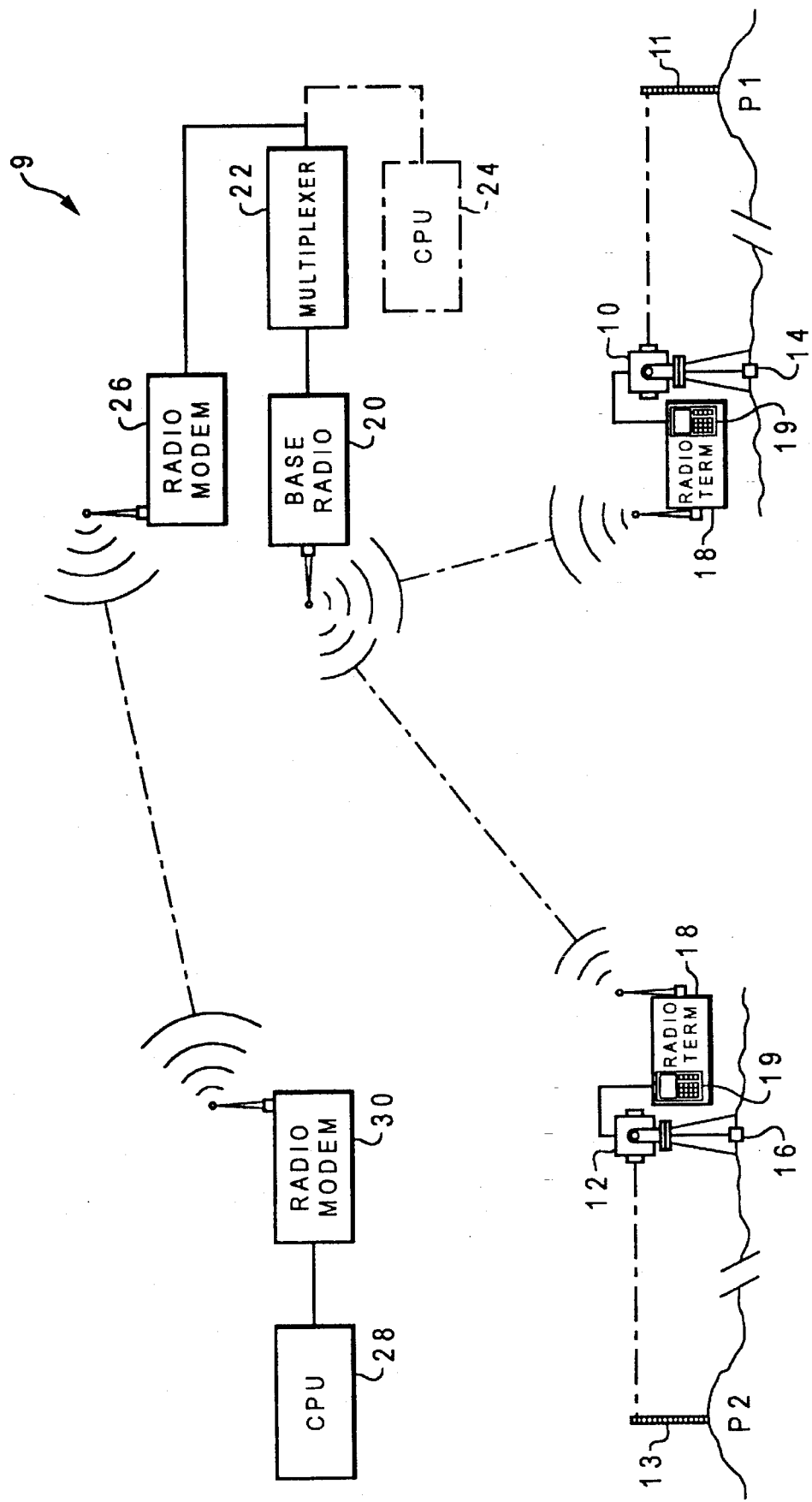
FIG. 1 is a diagram showing, in schematic form, the major components of the survey system of the present invention.

In the description which follows, like elements are referred to in conjunction with the same reference numerals, respectively. The drawing figures are primarily schematic diagrams in the interest of clarity and conciseness.

Referring to FIG. 1, there is illustrated a generalized schematic diagram of a survey system 9 in accordance with the present invention wherein a plurality of survey instruments 10 and 12 are shown in use with survey rods or targets 11 and 13 to determine the location of points P1 and P2, respectively, on the earth's surface. The points P1 and P2 may be part of a survey grid wherein the contour of the land is being worked during a reclamation process such as associated with reclaiming or restoring the contour of the land after it has been surface mined, determining the contour of previously unsurveyed lands, or placing reference stakes for various construction or mining operations.

By way of example, it is assumed that the points P1 and P2 are points on a grid of points prescribing the contour of reclaimed lands which are being restored after removal of a mineral value from just below the surface in a surface type mining operation or so-called "strip" mining operation. In determining the locations of the points P1 and P2, the type of survey instruments used may be of a self-contained electronic type which are capable of providing digital data indicating the Easting, Northing and elevation of the points P1 and P2, sometimes referred to as the x, y and z values of a survey point, respectively. The instruments 10 and 12 are operated in a conventional manner to receive data indicating the position values of known points 14 and 16 at which the instruments 10 and 12 are disposed, respectively. The reference points may be in the form of a line whose position and bearing are known. In order to determine the value of x, the distance East of a known point, the value of y, the distance North of a known point, and the value of z, the elevation above sea level, the corresponding values of the points 14 and 16, which are known are input to the survey instruments 10 and 12. The instruments 10 and 12 are then sighted in on a second known point, not shown, the x, y and z values of the second known point are input to the instruments and the bearing of the second known point from the points 14 and 16 is determined by the survey instruments, respectively. Accordingly, the x, y and z values of a third or unknown point may then be determined based on the information available to the survey instrument regarding the points 14 and 16 and the second known point with respect to the points 14 and 16, respectively. Various types of electronic survey instruments are available which are capable of taking measurements and providing data regarding the x, y and z value of a third or unknown point based on information supplied to and measurements taken by the instrument.

One type of survey instrument which is capable of the above-mentioned type of surveying practice is sold under the trademark Geodimeter by Geotronics of North America, Inc., Itasca, Ill. In particular, the instruments 10 and 12 may each be a Geodimeter 540 Survey Instrument. These instruments are provided with a keyboard to allow the input of data regarding the position of known points into the instrument operating circuit and the instrument also has a built in memory device capable of storing the x, y and z values of plural survey points. The keyboard is operable to allow the entry into the instrument operating system of data regarding the position of a known or predetermined point, for example, and whereby the instrument is operable from data supplied to it with respect to the reference point at which it is located, such as the points 14 and 16, upon command, to position its telescope in alignment with such known or predetermined point from the point at which it is situated. The above-mentioned type of survey instrument also has a built-in electronic data communications port for transmitting data with respect to measured survey points to a digital data receiving device for transmission, storage or use in calculating the position of other points. The survey instruments 10 and 12 are equipped with two-way communications capability using the standard Electronic Industry Association RS-232 specification.

The survey instruments 10 and 12 are suitably coupled to respective portable radio command or control terminals 18, each of which may be operated by self-contained batteries and mounted on the survey instruments themselves. Each radio terminal 18 has a suitable visual display and keyboard unit 19 for entering commands to operate the survey instruments 10 and 12, respectively, and to communicate with a central processing unit by way of a radio communications link and a controller or multiplexer to be described further herein. The radio terminals 18 may be of a type commercially available such as from Norand Corporation, Cedar Rapids, Iowa as their Model RT3210. The radio terminals 18 are each provided with an analog to digital converter, an FM radio transceiver, a digital processor, an alphanumeric keyboard and adapted for communication with the survey instruments 10 and 12, respectively, using the RS-232 format.

The survey system 9 of the present invention further includes a so-called base radio 20 which is characterized as an FM transmitter-receiver to provide a radio communications link between a central processing unit and the terminals 18, respectively. The base radio 20 includes a converter circuit which accepts signals from the terminals 18 and converts these signals to serial digital data in accordance with the RS-232 specification. In the same manner, the base radio 20 accepts digital data from the CPU by way of a controller or multiplexer 22 and converts it to a modulation signal for radio transmission to the terminals 18, respectively. The base radio 20 may also be of a type manufactured by Norand Corporation as their model RB2112.

As illustrated in the diagram of FIG. 1, the base radio 20 is electrically connected to the controller or so-called multiplexer 22. The multiplexer 22 may be directly connected to a central processing unit (CPU) or digital computer 24, for example, or by way of a radio modem 26 to a remotely located computer or central processing unit (CPU) 28 by way of a second radio modem 30. The arrangement of the radio modems 26 and 30 would be necessary if the survey instruments 14 and 16 would otherwise be out of range of the base radio 20 if it is directly coupled to a CPU at a remote location. In other words, if the radio transmission range is suitable, the terminals 18 may communicate with the base radio 20 which may be directly coupled or "hard wired" to the CPU 24 by way of the multiplexer 22. Alternatively, if the terminals 18 and the survey instruments 10 and 12 connected thereto, respectively, are located so far in the field that they are out of range of a base radio coupled directly to a CPU in a suitable location for the CPU, then the base radio 20, the multiplexer 22 and the radio modem 26 may be located in an intermediate position in the field within range of both the terminals 18 and the radio modem 30.

The multiplexer 22 may be an RM2260 Series controller manufactured by Norand Corporation. This controller has suitable circuits for receiving data from a CPU 24 or from the radio modem 26 in RS-232 format and may operate under the control of the CPU 24 or 28. Data from the CPU's 24 or 28 is processed, stored and communicated to the radio terminals 18 during predetermined communication cycles. Data from the terminals 18 is also stored in a suitable buffer in the multiplexer 22 until requested by the CPU 24 or 28. In this way, all data processing and communication carried out by the multiplexer 22 and the base radio 20 is transparent to the CPU 24 or 28. The terminals 18 monitor all transmissions from the base radio 20 and respond to messages containing specific address numbers. Data received by the terminals 18 from the survey instruments 10 and 12 or from their own keyboards is stored and transmitted to the base radio 20 when the terminals are polled by the base radio. The base radio 20 then converts the data received from the terminals to a digital data stream for transmission to the multiplexer 22 which includes a buffer for saving data to be forwarded to the CPU's 24 or 28 on command.

The radio modems 26 and 30, if used, may be of a type commercially available such as a model DR4800B2 manufactured by Data Radio, Inc. of Atlanta, Ga.

The "radio" signals transmitted by the apparatus comprising the terminals 18, the base radio 20 and the modems 26 and 30 may be any suitable form compatible with the particular type of apparatus used and need not be confined to the specific frequency band of the exemplary equipment described herein.

The central processing units (CPU) 24 and 28 may be asynchronous type computers using the ASCII character set such as conventional desk top computers manufactured by IBM Corporation and certain entities making so-called compatible computers, typically using DOS operating systems. The survey system of the present invention is not limited to computers having such characteristics, however.

The CPU's 24 or 28 may be equipped with operating system software and application programs. The operating system may provide basic computer functions—input of data from various sources (e.g. a keyboard, RS-232 communications port, or data storage device); basic manipulation of data; and output of data to various destinations (e.g. a video screen, RS-232 port, or data storage device). The application program may utilize the basic functions of the operating system to perform a stored list of complex operations such as database functions (storing data in a set of data or "database", retrieving particular data from a database, and modifying part or all of a database), performing certain calculations with data, and sending data to or receiving data from the radio terminals. Typically, the operation of the system includes the following list of operations (also known as the "communications cycle"). The computer is initialized by (a) selection of a particular database by the user, and (b) establishment of communications between the computer and the multiplexer 22.

The multiplexer or controller 22 is initialized by (a) starting the controller, (b) ensuring driver to controller communication, and (c) enabling the radio terminals 18. The communication cycle further includes the step of resetting the terminals 18 which are "active" or turned on and communicating a signal from the multiplexer 22 to the CPU that the appropriate terminals have been reset. The communication cycle further includes the step of causing the CPU 24 or 28 to ask the multiplexer 22 for data and reading the data that the controller or multiplexer has collected from the terminals 18. Data is processed by the application program upon receipt thereof and whatever calculations are required are then performed.

Figure 2:
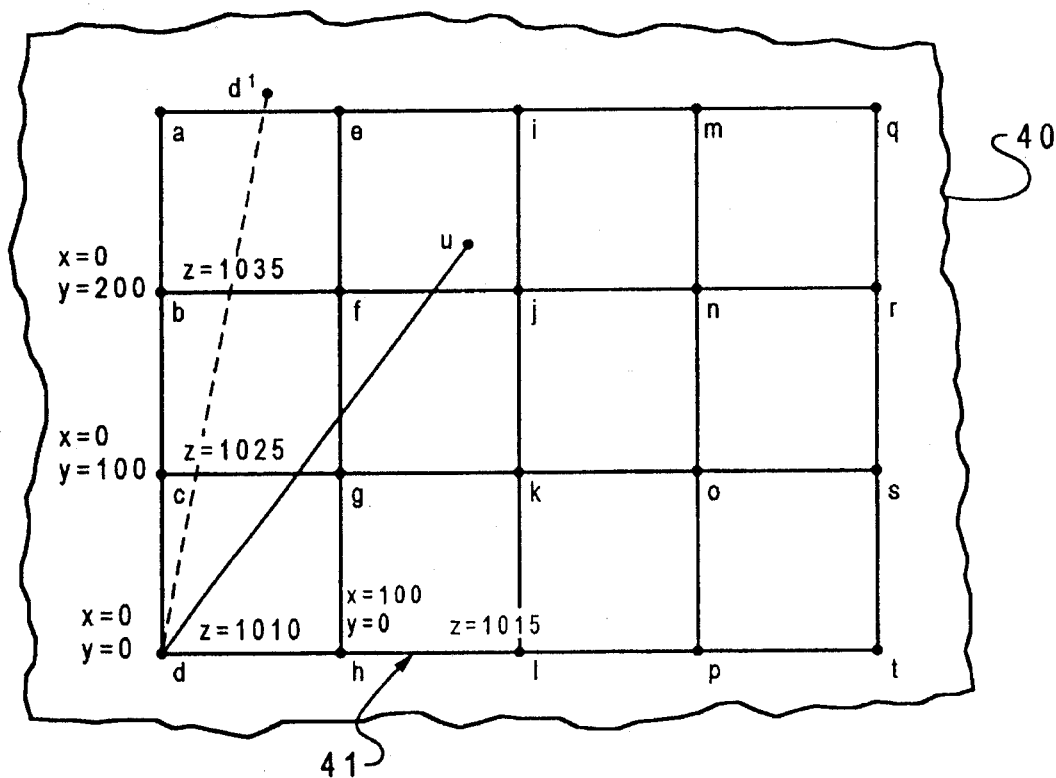
FIG. 2 is a diagram illustrating a survey grid and a survey point measuring method.

Referring now to FIG. 2, one method of operating the survey system 9 in accordance with the present invention is in conjunction with providing predetermined contours for an area 40, for example, of reclaimed land which is being contoured to a prescribed elevation at various selected points. Typically a grid 41 of survey points such as the points "a" through "t" is given a predetermined value for the x, y and z coordinates of each point. Points b, c, d and h are given exemplary values in FIG. 2. A survey instrument such as one of the instruments 10 or 12 is set on a known point "d", for example, or some other known point, a second known point d' is referenced and the x, y and z coordinates for a point "u", for example, are measured. Since point u does not correspond to the location of any of the predetermined points, its elevation, z, may be prescribed by a weighted averaging technique wherein the elevations of the points e, f, i and j, together with the distance $d_i$ of the point u from each of the points e, f, i and j are used in the equation:

$$z = \frac{\sum_{i=1}^{n} z_i/(d_i)^2}{\sum_{i=1}^{n} 1/(d_i)^2} \quad (I)$$

where $z_i$ is a neighboring point, $d_i$ is the distance to the neighboring point and where n is the number of z elements. The actual z value of point u is then compared with the calculated z value from equation (I) and this value is transmitted to the radio terminal 18 for display on the terminal display screen. The surveyor operating the survey instrument 10 or 12 may then communicate the information requiring the amount of cut or fill to be applied at the point u to the surveyor operating the survey rod or staking operation at the point in question.

The method of performing the above-mentioned survey operation may be carried out with the system of FIG. 1 by performing the following major steps. Assuming that only one terminal 18 is being used in conjunction with one survey instrument 10, for example, the terminal is initialized or identified to the CPU 24 or 28 as being operational. The CPU 24 or 28 will then display on the terminal a menu of routines which may be carried out by the system 9. The CPU 24 or 28 may contain several application programs such as an area reclamation program, or a program associated with providing predetermined locations of "shot" or "blast" holes for blast casting operations, for example. Assuming that a reclamation area is to be surveyed a predetermined area grid such as the area grid for the reclaimed area 40 in FIG. 2 is selected. The values of the x, y and z coordinates of the grid selected are for the finished contour of the area being reclaimed.

In many reclamation operations, a certain amount of material moved into an area to form the final contour is unsuitable for the prescribed surface conditions of the reclaimed land. For example, it is usually desirable to provide topsoil material which is suitable for growing those plants desired in the reclaimed area. Accordingly, during the process of grading the area described by the grid, a certain amount of fill material is placed in the area which has an elevation or "z" value less than the final elevation prescribed by the grid. Multiple layers of material may be deposited over a predetermined grid area before the final topsoil layer is added. For example, a layer of material which is totally unsuitable, i.e. ground rock, is filled to within minus ten feet of the predetermined final elevation, then a layer of more suitable earth is filled to a level of, say, minus two feet of the final elevation and, finally, the topsoil layer of two foot thickness is added to the final finished contour.

Accordingly, as the survey process is carried out, it is necessary to subtract from the final elevation values of the grid the thickness of the topsoil and "suitable" material when surveying the grading operations being carried out to fill the area determined by the grid with the unsuitable or base material. Accordingly, after selecting the grid 41, the elevation "offset" values are added or subtracted from the z values of the grid points so that, during surveying of the elevation of the finished material, the prescribed z values are obtained. A program may be adapted to "save" the adjusted grid z values as well as values of x, y and z received from the survey instrument. If so, such data is given a file number or name.

After adjusting the grid values for the survey being made at an intermediate elevation, a survey point or points are read and the prescribed z value of the point u, for example, is calculated in accordance with Equation (I). The result of this calculation is compared with the measured z value and the survey rod operator is then instructed to set a stake at the survey point marking the amount of cut or fill that is required to bring the point in conformance with the predetermined z value. The CPU is instructed to display the prescribed difference in the z value on the display of the terminal 18. These steps are repeated for every point surveyed with respect to the grid of FIG. 2, for example, or any particular grid being surveyed. The survey of the grid is repeated as the various layers of material are added to the reclaimed land area so that the final contour is as prescribed by the grid.

A similar method is carried out for providing survey stakes for terrain and structures such as slopes and streamchannels, roads, sediment ponds, diversion ditches and coal benches, for example. For instance, a file would be designed for entry into the CPU 24 or 28 consisting of station number, centerline coordinates and elevation. The slope staking program, when initiated, would ask for the slope and bed width of a stream. To survey the centerline of a stream, the surveyor would enter the identity of a survey point or "station number" at the radio terminal 18 asking the CPU 24 or 28 to send the x and y values of the station number to the survey instrument 10 or 12 via its terminal 18. The surveyor would then adjust the survey instrument to the x and y value prescribed and the elevation of the rod 11 or 13 would be communicated to the radio terminal 18 by the survey instrument. With the elevation of the "centerline" and the previously entered slope and width, a "try-out" distance would be calculated by the CPU 24 or 28 and transmitted to the radio terminal 18. The display on the radio terminal 18 would be communicated to a surveyor who would step off or tape measure a try-out distance from the centerline point. The survey point at the "try out" distance would be measured and the survey data, x, y, z values, sent to the CPU. A new try-out distance is then calculated by the CPU and communicated to the radio terminal 18. The new try-out distance is then tape measured from the stake or centerline and another x, y and z position surveyed by the instrument 10 or 12. With the values of the survey point entered into the CPU 24 or 28 from the survey instrument 10 or 12 by way of its terminal 18, the base radio 20 and the multiplexer 22, a further try-out distance may be calculated by the CPU and sent back to the radio terminal 18. This process is repeated until two equal try-out distances have been computed. The method clearly eliminates the laborious and repetitive task of hand calculating the try-out distance and, with the elimination of manual calculations, the time required for so-called slope staking is considerably reduced.

Figure 3:
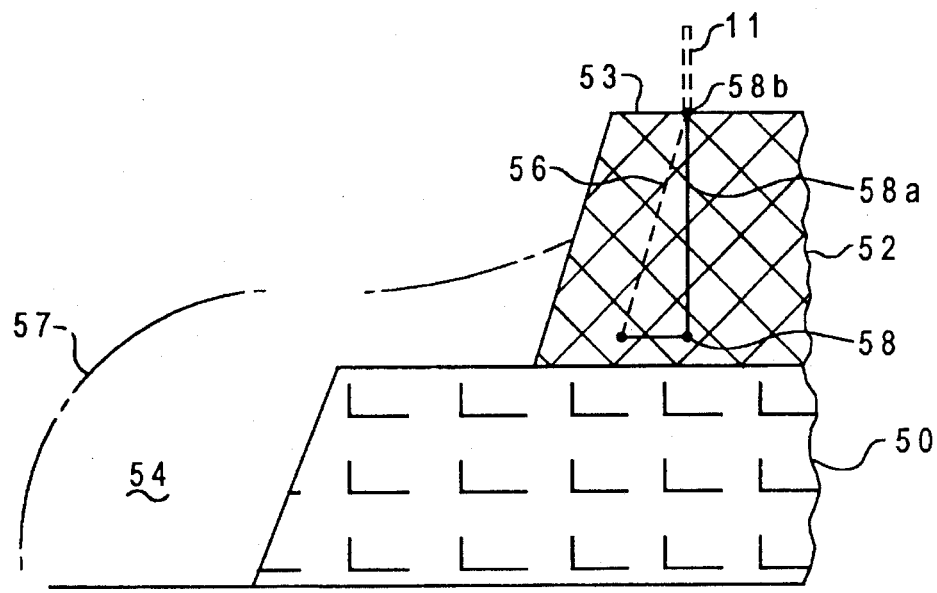
FIG. 3 a diagram illustrating a method for survey operations to determine a surface point for drilling a blasthole or shot hole.

Referring now to FIG. 3, there is illustrated, in schematic form, a cross-section of a coal seam 50 over which lies a layer of overburden material 52 which is to be dislodged and "cast" into a pit area 54 by a technique known as blast casting. Blast casting is carried out by drilling a pattern of so-called blastholes such as the blasthole 56, which holes are then filled with an explosive material which is detonated to cast a large portion of the overburden material off of the coal seam and into the pit area indicated by the dashed line 57 in FIG. 3, thereby saving time and expense associated with conventional excavation operations.

A predetermined pattern of blastholes 56 is entered into a suitable database in the CPU 24 or 28 giving x, y and z values of a point 58 disposed a predetermined distance above the coal seam 50. The point 58 is predetermined based on the desired angle and position of the blasthole 56 with respect to the line 58a. This data for a blasthole pattern is entered into a plurality of registers or a database in the CPU 24 or 28 and the survey instrument 10 or 12 is set up to provide for locating the x and y coordinates of the point 58b on the surface 53 of the overburden material 52. The survey rod 11 is prepositioned in accordance with the x and y values transmitted to the radio terminal 18 and the survey instrument 10 from the CPU 24 or 28. The elevation value z of point 58b is then read by the survey instrument. Since the length or "depth" of the hole 56 is to be determined in order to accommodate the predetermined blast pattern requirements, the elevation value of the point 58 is subtracted from the elevation value of point 58b to determine the length of the line 58a and this value is divided by the cosine of the predetermined angle between the line 58a and the blasthole 56. The value of the length or "depth" of the blasthole 56 is calculated by the CPU 24 or 28 and transmitted back to the survey instrument display or the radio terminal display unit 19 for communication by the surveyor operating the survey instrument 10 to the surveyor holding the survey rod 11. A suitable marker is then placed at point 58b indicating the depth and angle of the hole 56 with respect to the surface 53.

The major steps for carrying out the abovedescribed procedure would be the same, initially, as the steps for the method for providing the survey grid values, up to the point of displaying the menu. Upon display of the menu, the blast casting program would be selected, followed by selection of the requisite blast cast pattern "file". The blastholes in the blast cast pattern file would then be selectively identified and the x, y and z values for each blasthole or point 58 in the pattern would be called for display on the terminal 18. The x and y values could also be sent directly to the survey instrument 10 whereby, with the type of survey instrument previously described, the instrument may be automatically oriented to the proper bearing and the surveyor operating the instrument would give instructions to the operator holding the rod to guide the operator to the x and y position for the hole 58b, for example. As previously mentioned, when the point 58b is located by the survey rod using the instrument 10 or 12 and the system of the present invention, the elevation or z value of the point 58b is read by the survey instrument and transmitted to the CPU 24 or 28. The difference in elevations of the points 58 and 58b is then calculated by the CPU and divided by the cosine of the predetermined angle of the hole 56 to provide the hole depth value from the point 58b. This point is then transmitted by the CPU back to the radio terminal 18 for display whereby the surveyor may communicate this information to the operator holding the rod 11 for identifying the depth and angle of hole at the point 58b.

The steps in the methods described above for determining the elevation of a point on a reclamation grid, the location of a point or points on a contoured area such as a stream channel and the location of points and hole depths for a blast casting pattern may be carried out simultaneously by more than one survey instrument. Using the combination base radio 20 and controller or multiplexer 22 described above, for example, as many as 16 survey instrument/radio terminal combinations may be supported at one time.

The above-mentioned type of CPU may be programmed to include the above-mentioned applications programs including databases, surface grids, x, y, z comparisons, cut and fill calculations and hole depth calculations utilizing a computer language known as Paradox and C++ available from Borland International, Inc. of Scotts Valley, Calif. The Geodimeter control commands and MID communications programs may also be utilized to complete the communications between the survey instrument/radio terminal combination and the CPU.

Although preferred embodiments of a system and method for surveying in accordance with the present invention have been described in detail hereinabove, those skilled in the art will recognize that various substitutions and modifications may be made to the system and method without departing from the scope and spirit of the invention as recited in the appended claims.

What is claimed is:

1. A survey system for determining at least one of the Northing, Easting and elevation of a survey point from a predetermined point and for comparison with a calculated value of at least one of the Northing, Easting and elevation of said survey point comprising:

a survey instrument positioned in a known position with respect to said predetermined point, said survey instrument recording the Easting, Northing and elevation of a survey point surveyable by said survey instrument;

a radio terminal electrically connected to said survey instrument for receiving data related to said Northing, Easting and elevation of said survey point and for transmitting a radio frequency signal of said data;

a base radio disposed remote from said survey instrument and said survey point for transmitting and receiving signals of said data to and from said radio terminal;

a controller operably connected to said base radio for processing said data communicated to and from said base radio; and a central processing unit capable of communicating with said controller for communicating said data related to at least one of a predetermined number of survey points, the distance between one of said predetermined number of survey points and at least one of a plurality of predetermined survey points and the result of a geometric calculation of a parameter of said one of said predetermined number of survey points.

2. The system set forth in claim 1 including:

a second survey instrument and a second radio terminal electrically connected thereto for transmitting and receiving data with respect to at least one of the Northing, Easting and elevation of another survey point between said central processing unit and said second survey instrument by way of said second radio terminal, said base radio and said controller.

3. The system set forth in claim 1 or 2 wherein:

said central processing unit is in communication with said controller by way of radio transceiver means whereby said central processing unit may be disposed substantially remotely from said survey instruments, respectively.

4. The system set forth in claim 1 wherein:

said radio terminal includes means for inputting certain operating commands to said survey instrument and said central processing unit, respectively.

5. The system set forth in claim 1 wherein:

said survey instrument includes means for receiving commands from said central processing unit and said radio terminal for positioning said survey instrument to locate a survey point.

6. A method for surveying a predetermined area on the earth's surface to establish a predetermined elevation for at least one survey point in said area comprising the steps of:

providing a survey instrument having means for measuring the Northing, Easting and elevation of a predetermined survey point and transmitting data describing said one of said Northing, Easting and elevation to radio signal transmitting means;

providing a central processing unit disposed remote from said survey instrument and said predetermined survey point and including a plurality of registers or a database containing values of said at least one of said Northing, Easting and elevation of a plurality of survey points in said area;

providing radio signal transmitting means interposed between said survey instrument and said central processing unit for transmitting signals between said survey instrument and said central processing unit;

operating said survey instrument to measure at least one of said Northing, Easting and elevation of said predetermined survey point and transmitting the value of said at least one of said Northing, Easting and elevation through said radio signal transmitting means to said central processing unit;

comparing said at least one of said Northing, Easting and elevation of said predetermined survey point with a corresponding value of said one of said Northing, Easting and elevation of at least one of said plurality of survey points in said database; and transmitting a radio signal representing the value of the difference between said at least one of said Northing, Easting and elevation measured by said survey instrument and said corresponding value of said at least one of said plurality of survey points in said database to said survey instrument.

7. The method set forth in claim 6 wherein:

the step of comparing said at least one of said Northing, Easting and elevation of said predetermined survey point comprises determining the elevation of said predetermined survey point by comparing the distance of said predetermined survey point from selected ones of said plurality of survey points and calculating an elevation of said predetermined survey point based on the distances of said plurality of survey points from said predetermined survey point and the elevations of said plurality of survey points, respectively.

8. The method set forth in claim 7 including the step of:

modifying the values of the elevations of said predetermined plurality of survey points to provide offset values of said elevations prior to calculating the elevation of said predetermined survey point.

9. The method set forth in claim 6 wherein:

said radio transmitting means comprises a radio terminal operably associated with said survey instrument including visual display means and a base radio operably associated with said central processing unit, and said method includes the step of visually displaying said value of said difference on said display means.

10. A land survey method comprising the steps of:

providing a survey instrument having means for measuring at least one of the Northing, Easting and elevation of a predetermined survey point, said survey instrument including means for transmitting and receiving values of said at least one of said Northing, Easting and elevation of a predetermined survey point;

providing a central processing unit disposed remote from said survey instrument and said predetermined survey point and including a plurality of registers or a database containing at least one of the Northing, Easting and elevation of a plurality of survey points;

providing radio signal transmitting means for transmitting signals representing said values of said Northing, Easting and elevation of said predetermined survey point and said plurality of survey points between said survey instrument and said central processing unit;

operating said survey instrument to measure at least one of said Northing, Easting and elevation of said predetermined survey point and transmitting the measured value of said at least one of said Northing, Easting and elevation measured by way of said radio signal transmitting means to said central processing unit;

comparing said measured value with corresponding values of said at least one of said Northing, Easting and elevation of at least one of said plurality of survey points registered; and transmitting a radio signal representing a value of said at least one of said Northing, Easting and elevation of said predetermined survey point to said survey instrument and causing said survey instrument to at least one of visually display said value and position said survey instrument to be directed at a target disposed at said predetermined survey point.

11. The method set forth in claim 9 wherein:

said central processing unit includes a plurality of registers or a database containing values of at least one of the Northing, Easting and elevation of a plurality of survey points defining a pattern of blastholes to be drilled in a layer of overburden material, and said method includes the steps of;

transmitting values of the Easting and Northing of one of said plurality of survey points from said central processing unit to said survey instrument and causing said survey instrument to be directed at a target having said Northing and Easting value;

measuring the elevation of a survey point at said Northing and Easting value;

communicating the value of the measured elevation of said survey point from said survey instrument to said central processing unit;

subtracting a predetermined value of the elevation of said one survey point in one of said plurality of registers or said database from said measured elevation of said survey point and calculating the length of a blasthole to be drilled from said survey point at a predetermined angle at said survey point; and transmitting from said central processing unit to said survey instrument the value of the length of said blasthole to be drilled from said survey point.

12. A land survey method comprising the steps of:

providing a survey instrument having means for measuring at least one of the Northing, Easting and elevation of a predetermined survey point, said survey instrument including means for transmitting and receiving values of said at least one of said Northing, Easting and elevation of a predetermined survey point;

providing a central processing unit disposed remote from said survey instrument and said predetermined survey point and including a plurality of registers or a database containing values of at least one of the Northing, Easting and elevation of a plurality of survey points;

providing radio signal transmitting means for transmitting signals representing said values of said Northing, Easting and elevation of said predetermined survey point and said plurality of survey points between the survey instrument and said central processing unit;

causing said radio signal transmitting means to request the central processing unit to transmit the Northing and Easting values of a first predetermined survey point to said survey instrument by way of said radio signal transmitting means;

causing said survey instrument to point its telescope to a position corresponding to the Northing and Easting of said first predetermined survey point;

causing said survey instrument to read the elevation of said first predetermined survey point and communicate the value of the elevation of said first predetermined survey point to said central processing unit;

calculating the distance from said first predetermined survey point to a second predetermined survey point and transmitting said distance from said central processing unit to said survey instrument;

determining a second survey point located said distance from said first predetermined survey point and measuring the Northing, Easting and elevation of said second survey point;

transmitting the values of said Northing, Easting and elevation of said second survey point to said central processing unit and calculating a new distance from said first predetermined survey point based on the values measured of said second survey point;

repeating the process of measuring the Northing, Easting and elevation of said second survey point and calculating a distance from said first predetermined survey point to said second survey point until two substantially equal distances have been calculated; and marking the location of said second survey point based on the two equal distances from said first predetermined survey point to said second survey point.

13. A land survey method comprising the steps of:

providing plural survey instruments, each having means for measuring at least one of the Northing, Easting and elevation of a survey point, said survey instruments each including means for transmitting and receiving values of said at least one of said Northing, Easting and elevation of said survey points;

providing a radio terminal electrically connected to each of said survey instruments, respectively, for transmitting data representing values of said at least one of said Northing, Easting and elevation of a survey point received from said survey instrument and to said survey instrument, respectively;

providing a central processing unit disposed remote from said radio terminals, said survey instruments and said survey points and including a plurality of registers or a database containing values of at least one of the Northing, Easting and elevation of a plurality of survey points;

providing a base radio for receiving and transmitting signals with respect to said radio terminals, respectively, of said values of said Northing, Easting and elevation of said survey points measured by said survey instruments and said plurality of survey points registered by said central processing unit;

providing a controller electrically connected to said base radio and to said central processing unit for communicating said values between said radio terminals and said central processing unit;

initiating a survey measurement by at least one of said survey instruments by causing said central processing unit to effect communication with said controller;

selecting one of said plurality of registers or said database containing in said central processing unit having said values of said survey points;

communicating data from said controller to said central processing unit;

causing said radio terminals to be set to transmit or receive data with respect to said base radio; and causing said central processing unit, said controller, said base radio and said radio terminals to effect at least one of communicating data representing a value of at least one of the Northing, Easting and elevation of a survey point measured by said survey instruments, respectively, to said central processing unit and communicating said data from said central processing unit to said radio terminals, respectively.

* * * * *